United States Patent
Sgamboti et al.

[11] Patent Number: 5,931,007
[45] Date of Patent: Aug. 3, 1999

[54] ASBORPTION REFRIGERATION SYSTEM WITH CONDENSATE SOLUTION COUPLING

[75] Inventors: Carmen T. Sgamboti, Wethersfield, Conn.; Robert C. Reimann, Lafayette, N.Y.

[73] Assignee: Carrier Corporation, Farmington, Conn.

[21] Appl. No.: 09/046,722

[22] Filed: Mar. 24, 1998

[51] Int. Cl.$^6$ .................................................. F25B 15/00
[52] U.S. Cl. ............................ 62/101; 62/476; 62/485
[58] Field of Search ........................... 62/101, 102, 103, 62/476, 485

[56] References Cited

U.S. PATENT DOCUMENTS

| | | | |
|---|---|---|---|
| 4,520,634 | 6/1985 | Oouchi et al. | 62/476 |
| 4,531,374 | 7/1985 | Alefeld | 62/79 |
| 4,551,991 | 11/1985 | Miyoshi et al. | 62/476 |
| 4,667,485 | 5/1987 | Ball et al. | 62/476 |
| 4,732,008 | 3/1988 | DeVault | 62/79 |
| 5,205,136 | 4/1993 | DeVault et al. | 62/476 |
| 5,335,515 | 8/1994 | Rockenfeller et al. | 62/476 |
| 5,390,509 | 2/1995 | Rockenfeller et al. | 62/476 |
| 5,575,156 | 11/1996 | Howe | 62/101 |
| 5,727,397 | 3/1998 | He | 62/476 |

*Primary Examiner*—William Doerrler
*Attorney, Agent, or Firm*—Wall, Marjama, Bilinski & Burr

[57] ABSTRACT

A multiple effect absorption refrigeration system containing a plurality of paired generators and condensers that are staged to operate at successively higher temperatures and pressures. A solution to solution heat exchanger is associated with each stage to exchange heat between strong and weak solution circulating between the absorber and the generator of the various stages. A condensate to solution heat exchanger is included in at least one stage for placing condensate from the condenser of a higher temperature stage in heat transfer relation with solution being delivered into the generator of a lower temperature stage. Condensate from the condensate to solution heat exchanger is expanded to a system component that is operating at a pressure below the operating pressure of the stage being serviced by the condensate to solution heat exchanger.

15 Claims, 5 Drawing Sheets

ASBORPTION REFRIGERATION SYSTEM WITH CONDENSATE SOLUTION COUPLING

BACKGROUND OF THE INVENTION

This invention relates to a multiple effect absorption system and, in particular, to raising the coefficient of performance (COP) of a multiple effect absorption refrigeration system.

The development of multiple effect absorption refrigeration systems places particular emphasis on triple effect systems utilizing three vapor generator and refrigerant condenser units. The generator of each unit is coupled to one or more system absorbers and the condenser of each unit, in turn, is coupled to one or more system evaporators. A triple effect system is described in U.S. Pat. No. 4,531,374 to Alefeld (FIG. 44G). The three generator and condenser units are staged so the units operate at successively higher pressures and temperatures. External heat is provided to the generator that is operating at the highest pressure and temperature to evaporate refrigerant from the absorbent solution delivered from the system absorber section. The refrigerant is condensed in the generator of the intermediate stage, thus causing additional refrigerant vapor to evolve from the intermediate stage generator. The vapor from the intermediate stage generator is condensed in the generator of the third low pressure generator. The refrigerant vapor that is produced in the third stage generator is, in turn, condensed in the third stage condenser and is flashed to the system evaporator along with that of the other two condensers to provide the refrigeration effect.

In many single and double effect absorption refrigeration systems, solution heat exchangers are provided in which energy (heat) is transferred between strong and weak absorbent solution as it moves between the system absorber and the one or more refrigerant generators. For purposes of this disclosure, absorbent solution that is rich in refrigerant will be referred to as weak solution and absorbent solution that is relatively deplete of refrigerant will be referred to as strong solution. The solution heat exchangers are employed to transfer heat from the higher temperature, relatively strong, solution streams into the lower temperature, relatively weak, solution streams so as to recover available energy present in the solution. The efficiency of these solution heat exchangers is limited by the costs involved and the system fluid handling capabilities.

In U.S. Pat. No. 5,205,136 to DeVault et al., a method for further increasing the efficiency of a triple effect absorption refrigeration cycle is disclosed. This method is referred to as double condenser coupling or simply DCC. Here, high temperature refrigerant vapor developed in the high temperature stage is condensed and used to drive the generator of the intermediate temperature stage Heat contained in the resulting liquid refrigerant is then used to drive the generator of the low temperature stage by further subcooling the liquid refrigerant. The condensate from both the intermediate temperature and low temperature generators, along with the condensate from the low temperature condenser are all expanded to the system evaporator to create the desired refrigerant effect. Although this system is an improvement over prior art triple effect systems, not all the available heat in the condensate is fully utilized within the system.

Erickson et al. in U.S. Pat. No. 5,653,116 discloses a split triple effect absorption refrigeration system containing two hermetic loops. One loop is a double effect loop while the other is a single effect loop which overlaps the high pressure section of the double effect loop. Heat exchangers are provided within the loops and between the loops for exchanging heat between weak and strong solution and between refrigerant condensate and a relatively weak solution. In one form of the system, shown at FIG. 2, the condensate developed in the second stage of the double effect loop is placed in heat transfer relationship with weak solution passing between the absorber and the low temperature generator in this loop. The condensate, after it has given up heat to the weak solution, is passed directly from the upper stage condenser directly to the low temperature stage condenser.

SUMMARY OF THE INVENTION

It is therefore a primary object of the present invention to improve multiple effect absorption refrigeration systems.

It is a further object of the present invention to increase the thermal efficiency of multiple effect absorption systems.

Another object of the present invention is to make effective use of high temperature condensate within a multiple effect absorption refrigeration system in a manner that increases the efficiency of the system.

Yet another object of the present invention is to efficiently utilize the available internal energy of multiple stage absorption refrigeration systems by transferring the energy at the correct temperature and pressure between fluids to achieve greater overall system performance.

These and other objects of the present invention are attained in a multiple effect single loop absorption refrigeration system having at least three paired generator and condenser units that are staged within the loop so that each successive unit operates at a higher pressure and temperature. The generator of the highest temperature stage is driven by an external source while the generator of each lower temperature stage is driven by the heat developed in the refrigerant condenser of the next higher stage. A solution to solution heat exchanger is associated with the generator of each stage to exchange energy between solution being delivered to the generator and solution leaving it. A condensate to solution heat exchanger is also associated with at least one of the generators of a temperature stage before the high temperature stage for exchanging heat between the condensate of a higher temperature stage and solution being passed into the generator of the lower temperature stage.

In one form of the invention both the solution to solution heat exchanger and the condensate to solution heat exchanger associated with one of the stages are integrated to provide heat to the weak solution entering the generator of the associated stage. Additional heat may be added to the weak solution in the integrated heat exchanger from the flue gases emanating from an external heat source used to power the generator of the high temperature stage.

BRIEF DESCRIPTION OF THE INVENTION

For a better understanding of these and other objects of the present invention, reference will be made to the following detailed description of the invention which is to be read in association with the accompanying drawings, wherein.

DESCRIPTION OF THE INVENTION

The present invention involves a single loop multiple-effect absorption refrigeration system, however, for explanatory purposes, the system will be described with specific reference to a triple effect system.

Figure 1:
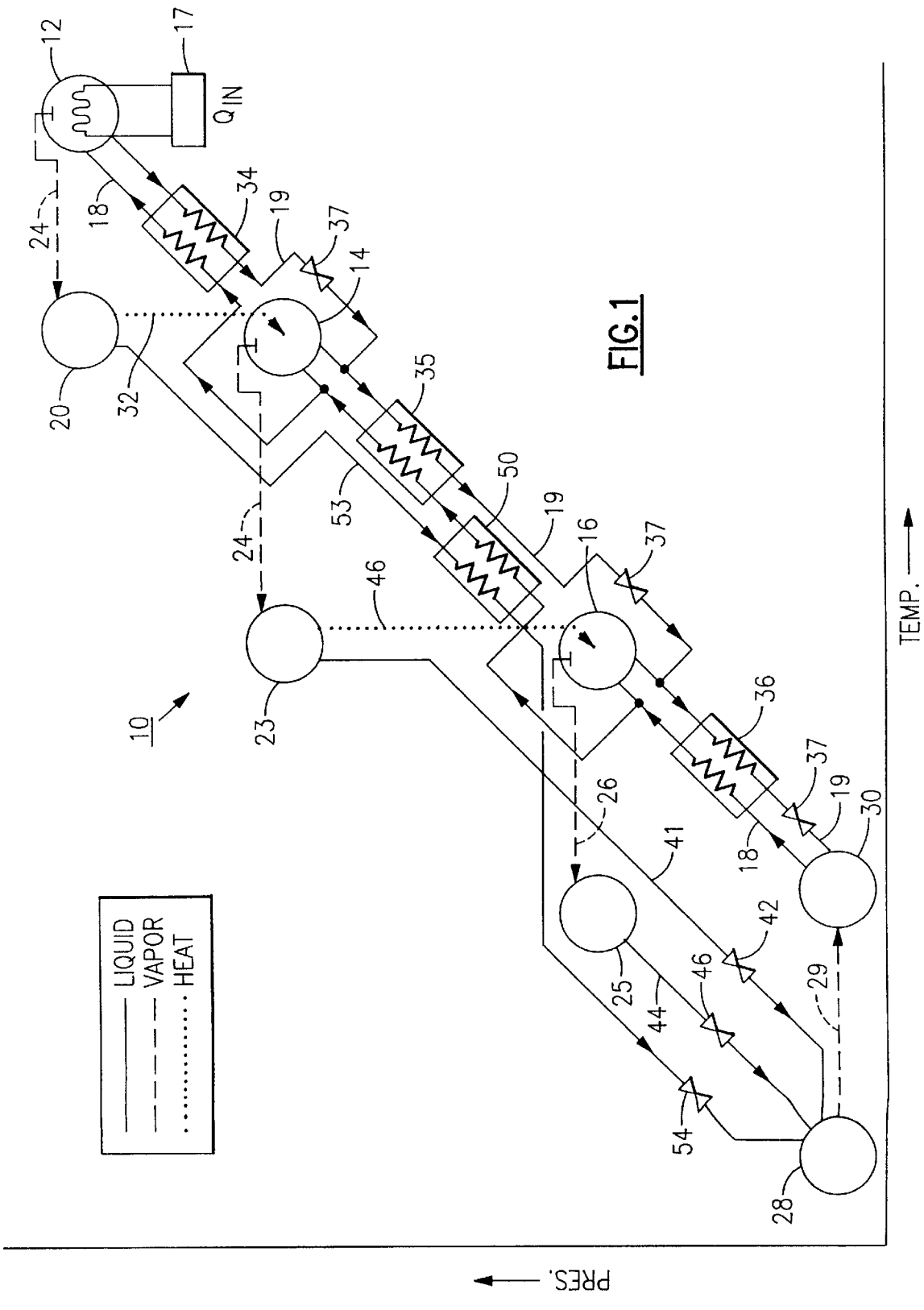
FIG. 1 is a schematic representation of a first embodiment of the present invention showing a parallel flow triple effect system utilizing single condensate to solution coupling with condensate expansion directly to the system evaporator further illustrating the thermodynamic relationship between system components.

With reference to FIG. 1, there is shown therein a triple effect absorption system generally referenced 10. The system includes a first high temperature generator 12, a second intermediate temperature generator 14 and a third low temperature generator 16. The generators, in turn, are coupled in parallel to an absorber 30 for receiving a weak absorbent solution from the absorber via solution supply line 18. Strong solution is returned to the absorber by means of a solution return line 19. Each generator is operably coupled or paired with an associated condenser. The high temperature generator is coupled to the high temperature condenser 20 by vapor line 21, the intermediate temperature generator 14 is coupled to intermediate temperature condenser 23 by vapor line 24 and the low temperature generator 16 is coupled to the low temperature condenser 25 by vapor line 26. Each condenser operates at essentially the same pressure as the associated generator and is arranged to condense the refrigerant vapor it receives from the generator to a liquid. As will be explained in greater detail below, the condensed refrigerant is expanded to the system evaporator 28 to produce the desired refrigeration effect. Vaporized refrigerant developed in the evaporator is passed to the absorber by vapor line 29 where it is combined with absorbent and the cycle is repeated. Although not shown, the system includes one or more pumps when required to move the solution between the various system components.

The high temperature generator 12 is equipped with an external heat source 17 which typically utilizes natural gas, oil, steam or the like arranged to heat the solution in the generator to a temperature whereby the refrigerant vaporizes and the vapor is released to the condenser 20. As indicated by the dotted line 32 extending between the high temperature condenser 20 and intermediate temperature generator 14, heat liberated during the condensing process is used to provide energy to the intermediate temperature generator 14.

Although not shown, in practice the condenser 20 can be contained in the same shell as the generator 14 with the heat exchanger tubes of the condenser being in heat transfer relationship with the relatively weak absorbent solution delivered into the generator for vaporizing the refrigerant contained therein.

The solution flow lines 18 and 19 are passed through solution heat exchangers as the strong and weak solution moves between the generator stages and the absorber. These include a high temperature solution to solution heat exchanger 34, an intermediate solution to solution heat exchanger 35, and a low temperature solution to solution heat exchanger 36. As the returning relatively strong solution leaves each stage, it is expanded to a lower pressure by appropriate throttling valves 37 mounted in the return line.

The refrigerant vapor from the intermediate temperature generator 14 is passed by vapor line 24 into the intermediate condenser 23 and reduced to a liquid condensate. Here again, as indicated by phantom line 40, the heat from the condenser 23 is used to provide energy to the low temperature generator 16. The absorbent solution in the low temperature generator is again heated and refrigerant contained in the generator is vaporized and passed to the third low temperature condenser 25 via vapor line 26. The condensate from condenser 23 is passed through line 41 and throttling valve 42 and expanded into the system evaporator 28. Condensate from the condenser 25 is similarly passed through line 44 and valve 46 into the system evaporator.

As noted above, the high pressure refrigerant condensing in the high temperature condenser 20 is used to heat the intermediate stage generator 14 and leaves the high temperature condenser 20 as a high temperature liquid via liquid line 53. Upon leaving the high temperature condenser, the condensate is placed in heat transfer relationship with the weak solution as the solution moves into the generator to augment the heat provided by the solution to solution heat exchanger. 35. The transfer of heat from the condensate to the weak solution takes place in a condensate to solution heat exchanger 50 which is shown positioned upstream from the solution to solution heat exchanger. The positioning of the condensate to solution heat exchanger in regard to the solution to solution heat exchanger is not critical and the condensate to solution exchanger may be positioned either upstream, downstream, or integrated with the solution to solution heat exchanger, depending upon cycle temperatures and design. The subcooled condensate leaving the condensate to solution heat exchanger is expanded directly into the system evaporator 28 by means of expansion valve 54.

As can be seen, the apparatus of the present invention utilizes an internal heat transfer that is based on the appropriate condensate temperature levels and makes the exchange of available energy in the condensate into the weak solution going into the next higher temperature generator, thus increasing the efficiency of the system.

Figure 5:
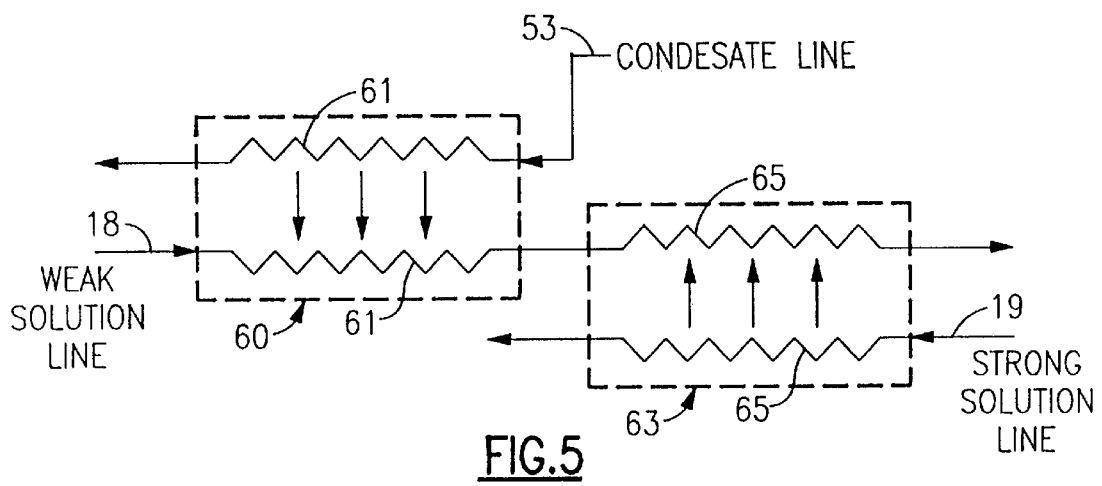
FIG. 5 is a schematic view showing a condensate to solution heat exchanger employed in the present invention connected in series with a solution to solution heat exchanger.

Referring to FIG. 5, there is shown an enlarged side elevation of a non-integrated heat exchanger arrangement employed in the above noted system. The condensate-solution exchanger includes a housing 60 through which the condensate line 53 and the weak solution line 18 pass. Heat transfer device 61 of any suitable design known and used in the art is contained in the housing which efficiently transfer energy from the high temperature condensate into the solution moving into the next higher temperature generator. Downstream from housing 60 in the direction of solution flow is a second solution-solution heat exchanger housing 63 through which the weak solution line 18 and the strong solution line 19 run. Here again, heat transfer device 65 is contained in the housing to efficiently exchange energy between the two flows. It should be evident that the relative positions of the two heat exchangers may be reversed so that the solution to solution exchanger is upstream from the condensate to solution exchanger.

Figure 6:
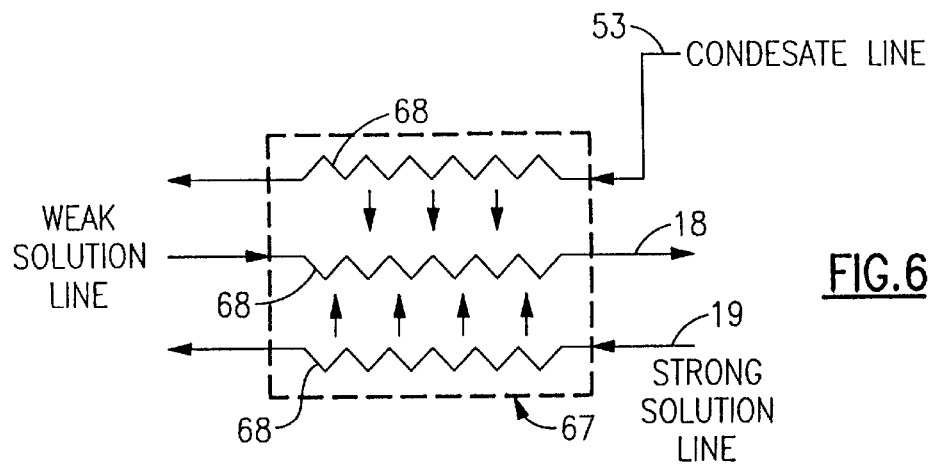
FIG. 6 is a schematic view showing a condensate to solution heat exchanger integrated with a solution to solution heat exchanger.

FIG. 6 relates to an integrated heat exchanger suitable for use in the present system in which the condensate line 53 and the two solution lines 18 and 19 pass through a single heat exchange housing 67. Heat transfer device 68 is arranged to transfer the available energy from the condensate and the strong solution into the weak solution as it moves into the next higher temperature generator.

Figure 7:
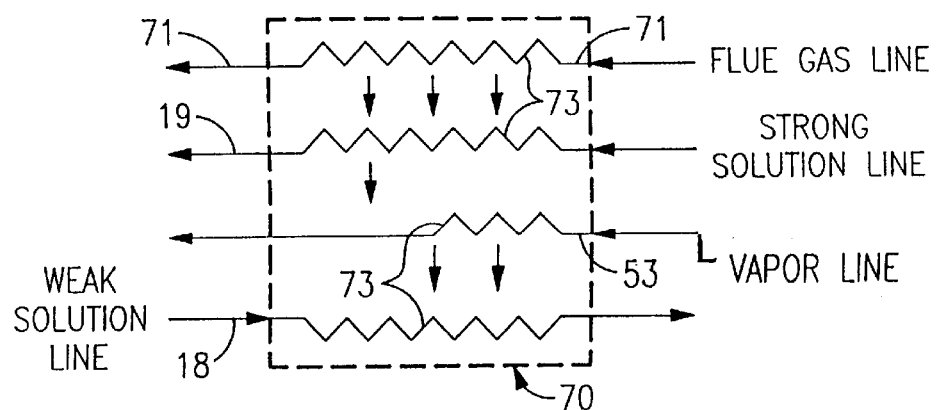
FIG. 7 is a schematic view similar to FIG. 6 showing an integrated four circuit heat exchanger with a flue gas circuit, a refrigerant circuit, and two solution circuits all arranged to provide heat to weak solution entering one of the stages.

FIG. 7 is a further example of an integrated heat exchanger further utilizing heat from the flue gases recovered from burner 30 (FIG. 1). The exchanger is enclosed within a housing 70 through which a flue gas recovery line 71 runs. Also running through the housing are the weak solution line 18 and the strong solution line 19. Refrigerant vapor from the high temperature generator is passed into the housing via line 53 and is then passed on to the high temperature condenser. Again, suitable heat transfer arrangement 73 is contained in the housing to provide for extraction of the available energy.

Figure 2:
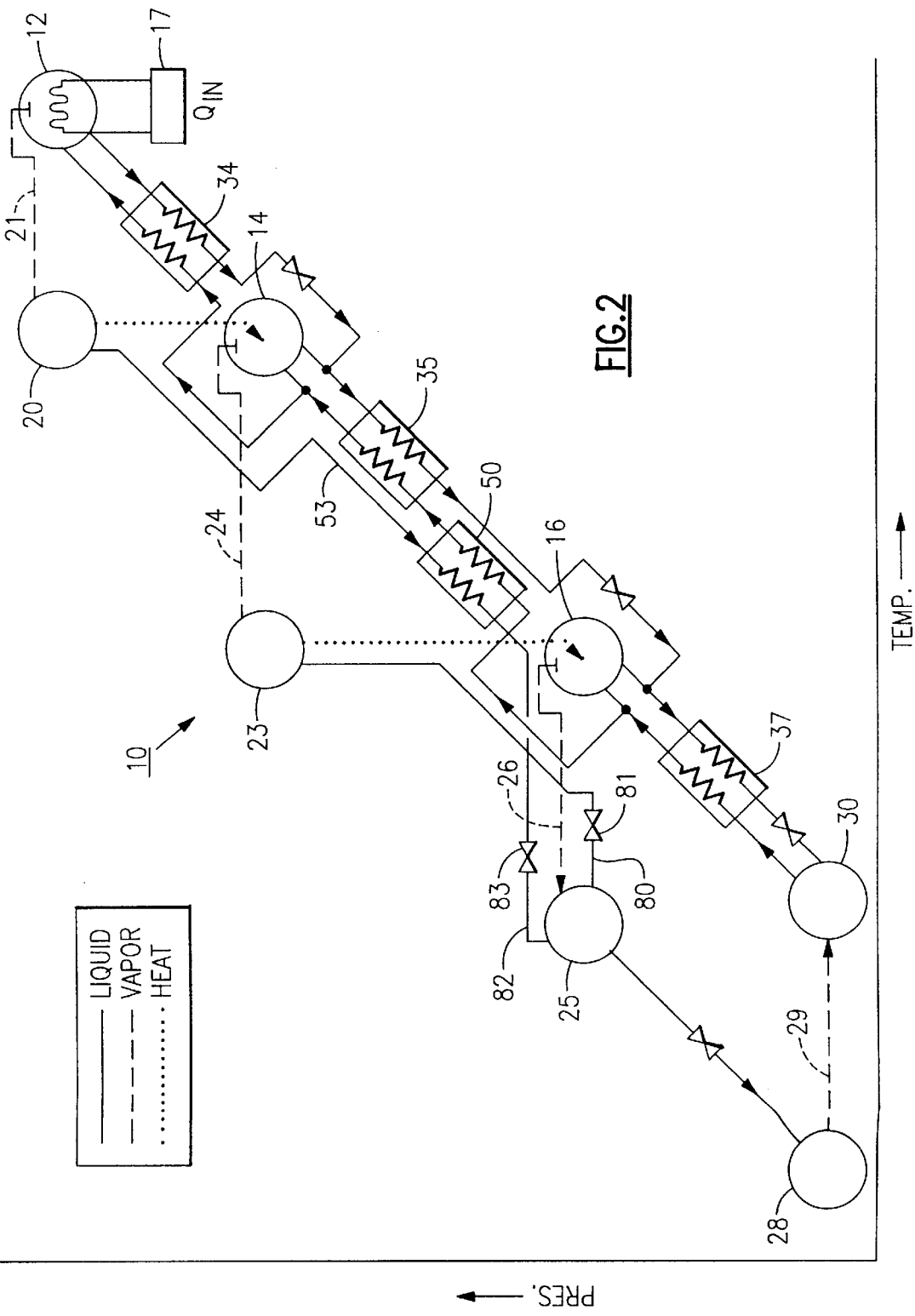
FIG. 2 is a schematic representation showing a further embodiment of the invention comprising a parallel flow triple effect absorption system utilizing condensate to solution coupling with upper stage condensate expansion to the low temperature condenser and then to the evaporator.

FIG. 2 schematically represents a triple effect parallel absorption refrigeration system similar to that depicted in FIG. 1, wherein like numerals designate like parts as those described above. In this embodiment, the refrigerant condensate leaving the medium condenser 23 is flashed to the low temperature condenser 25 via line 80 and throttling valve 81. Similarly, condensate leaving the condensate to solution heat exchanger 50 is flashed to the same condenser via line 82 and throttling valve 83. As can be seen, all condensate from the intermediate temperature condenser and the condensate-solution heat exchanger is rejected in the low temperature condenser thus reducing the amount of heat that the evaporator must handle to produce the refrigeration effect and placing the heat rejection function in the condenser where it belongs. This modification is believed to increase the cycle COP by about 3%.

Figure 3:
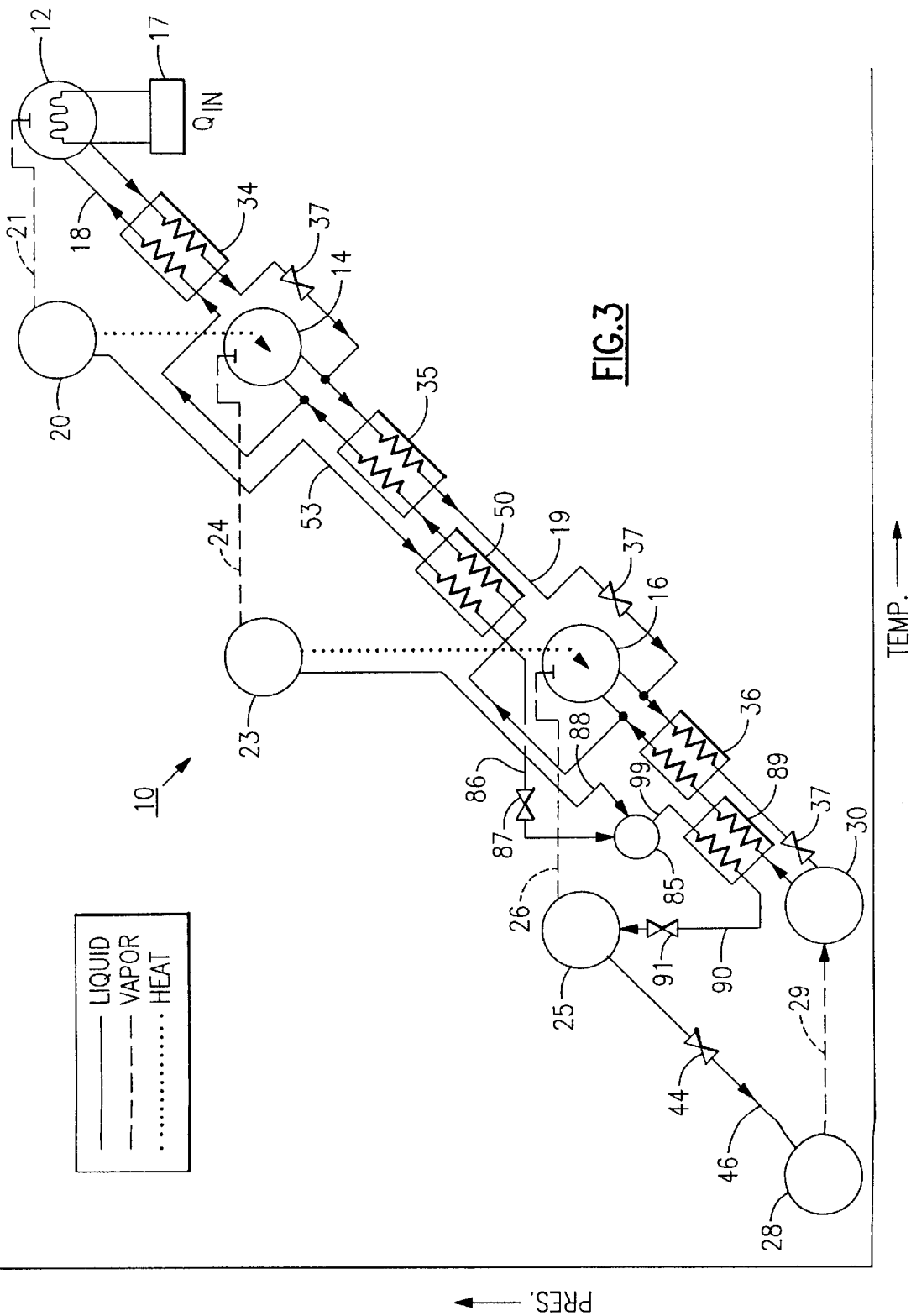
FIG. 3 is a schematic representation illustrating another embodiment of the invention comprising a parallel flow triple effect absorption system utilizing double condensate to solution coupling with expansion of the upper stage condensates to a lower stage condenser and then to the evaporator.

FIG. 3 is a further schematic showing another embodiment of the invention wherein the generators of a triple effect absorption system are again placed in parallel flow relation with the absorber and features a double condenser to solution coupling arrangement with expansion of the condensate from the two condensate to solution heat exchangers to the low temperature condenser. Here again, like numbers are used to designate like components previously described above. In this embodiment, the condensate leaving the first condensate solution heat exchanger 50 is flashed to a mixer 85 via line 86 and throttling valve 87. The condensate developed in the intermediate temperature condenser 23 is also passed via line 88 into the mixer and combined with that from heat exchanger 50. The combined condensate is then passed through a second condensate to solution heat exchanger 89 via line 99 where it is placed in heat transfer relation with the solution moving from the system absorber to the first solution heat exchanger 36. The combined subcooled condensate is flashed to the low temperature condenser through line 90 and throttling valve 91 for additional heat rejection.

Figure 4:
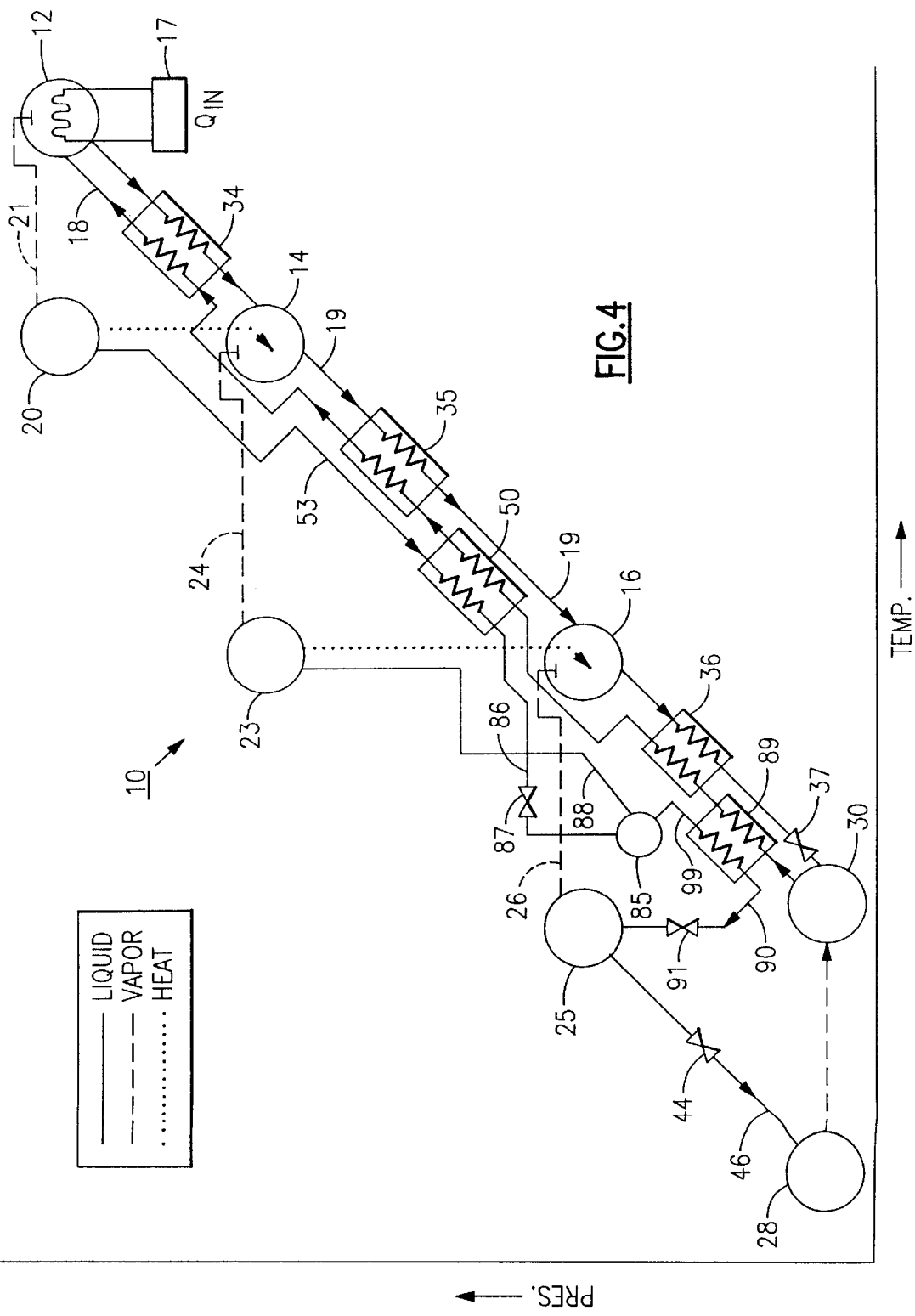
FIG. 4 is a further schematic representation showing yet another embodiment of the invention comprising a series flow triple effect absorption system utilizing double condensate to solution coupling with condensate expansion to the low temperature condenser and then to the evaporator.

FIG. 4 illustrates a triple effect system embodying the teaching of the present invention wherein the generators 12, 14 and 16 of the three stages are connected in series flow relationship with the absorber 30. Here again, the system utilizing double condenser to solution coupling as explained in greater detail above with reference to FIG. 3. The subcooled condensate in line 86 is combined with condensate in line 88 in mixer 85. The combined condensate is flashed into the low temperature condenser through line 90 and valve 91 for additional heat rejection before entering the evaporator.

While this invention has been explained with reference to the structure disclosed herein, it is not confined to the details set forth and this invention is intended to cover any other cycle arrangements utilizing condensate to solution coupling and routing of the sub-cooled condensate to successive lower temperature system components that come within the scope of the following claims:

What is claimed is:

1. A single loop triple effect absorption refrigeration system that includes:
   an evaporator means and an absorber means,
   three paired generator and condenser units that are operatively connected in stages that include a high temperature stage, an intermediate temperature stage, and a low temperature stage with heat developed in the high temperature stage being used to drive the generator of the intermediate temperature stage and heat developed in the intermediate temperature stage used to drive the generator of the low temperature stage;
   flow means for circulating weak solution from the absorber means to the generator of each stage and returning strong solution from the generator of each stage back to the absorber means;
   a first condensate to solution heat exchanger for placing condensate from the high temperature stage in heat transfer relationship with weak solution passing into the generator of the intermediate stage;
   a second condensate to solution heat exchanger for placing condensate from the intermediate temperature stage in heat transfer relationship with weak solution passing into the generator of the low temperature stage;
   mixing means for collecting condensate from the intermediate stage condenser and the first condensate to solution heat exchanger and passing the collected condensate to said second condensate to solution heat exchanger, and
   means for expanding the condensate from the second condenser to solution heat exchanger into the condenser of the low temperature stage.

2. The system of claim 1 that further includes a solution to solution heat exchanger associated with each of the stages for placing weak solution passing into the generator of each stage with strong solution returning to the absorber means.

3. The system of claim 2 wherein the flow means is arranged to connect the generators of the stages in parallel flow relationship.

4. The system of claim 2 wherein the flow means is arranged to connect the generators of the stages in series flow relationship.

5. The system of claim 2 wherein the flow means is arranged to connect the generators in a combined series—parallel flow relationship.

6. The system of claim 2 wherein the solution to solution heat exchangers associated with the intermediate and low temperature stages are positioned upstream from the first and second condenser to solution heat exchangers.

7. The system of claim 2 wherein the solution to solution heat exchangers associated with the intermediate and low temperature stages are located downstream from the first and second condenser to solution heat exchangers.

8. The system of claim 1 that further includes throttling means for expanding the condensate leaving the second condensate heat exchanger to the condenser of the low temperature stage.

9. The system of claim 1 that further includes throttling means for expanding condensate leaving the second condensate to solution heat exchanger to the evaporator means.

10. The system of claim 2 wherein the condensate to solution heat exchanger associated with one of the stages is integrated with a solution to solution heat exchanger so that heat from the condensate and the strong solution is transferred to the weak solution passing into the generator of the associated stage.

11. A single loop multiple effect absorption heating and cooling system that includes
- an absorber means connected by a flow circuit to at least three generators that are staged to operate at successively higher temperatures and pressures;
- said flow circuit being arranged to deliver weak solution to each of said generators and return strong solution from each of the generators back to said absorber;
- a condenser operatively connected to each of said staged generators for condensing refrigerant from an associated generator,
- a solution to solution heat exchanger means associated with said flow circuit means for providing heat from said strong solution being returned to said absorber to said weak solution being delivered into each generator stage,
- condensate to solution heat exchanger means associated with said flow circuit means for providing heat from said refrigerant condensate to said weak solution being delivered into at least two of said generator stages, and
- throttling means for expanding the condensate leaving the condensate to solution heat exchanger means into a lower pressure component of the system.

12. The absorption system of claim 11 wherein said condensate to solution heat exchanger means includes multiple condensate to solution heat exchangers arranged to provide heat to weak solution delivered into each of said generator stages.

13. The absorption system of claim 12 wherein said flow means is arranged to connect the staged generator in a series flow relationship.

14. The absorption system of claim 12 wherein said flow means is arranged to connect the staged generator in a parallel flow relationship.

15. The absorption system of claim 11 wherein said condensate leaving the condensate to solution heat exchanger means is expanded into the condenser operating at the lowest temperature.

* * * * *